April 9, 1968 J. L. LUTES 3,377,615
COMPLIANT SUSPENSION SYSTEM
Filed April 25, 1966 4 Sheets-Sheet 1
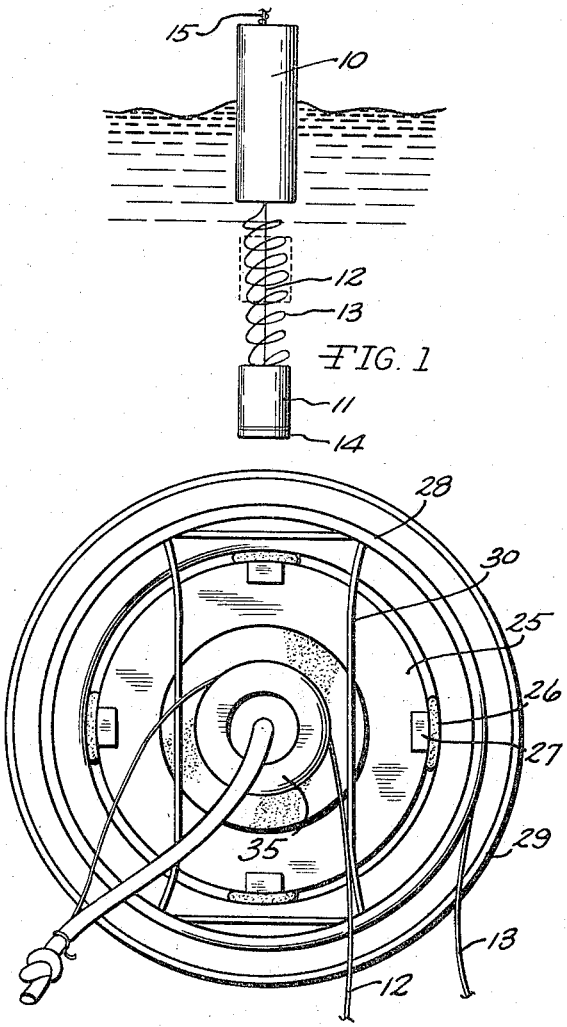
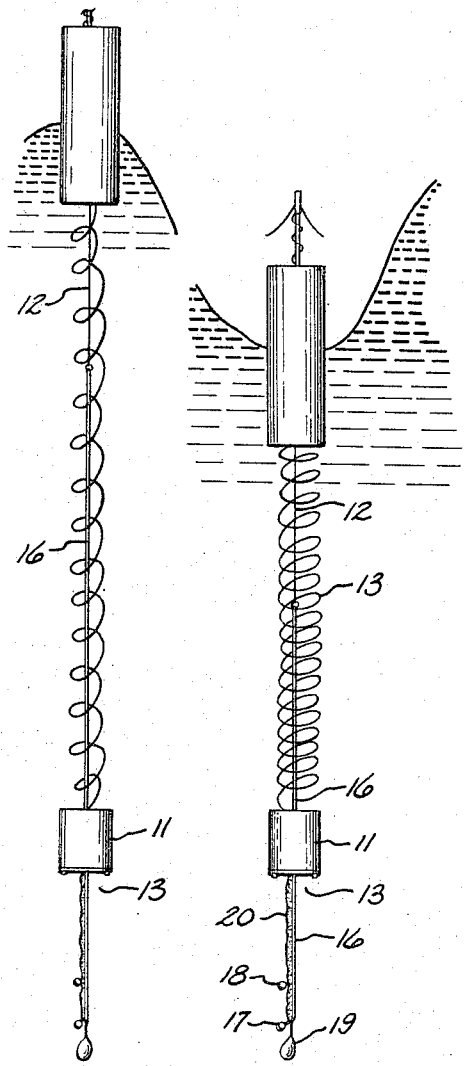
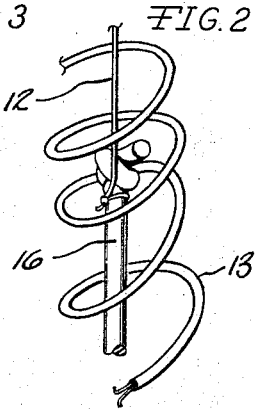
INVENTOR
JAMES L. LUTES
BY Beaman & Beaman
ATTORNEYS April 9, 1968 J. L. LUTES 3,377,615
COMPLIANT SUSPENSION SYSTEM
Filed April 25, 1966 4 Sheets-Sheet 2

INVENTOR
JAMES L. LUTES

BY Beaman & Beaman

ATTORNEYS

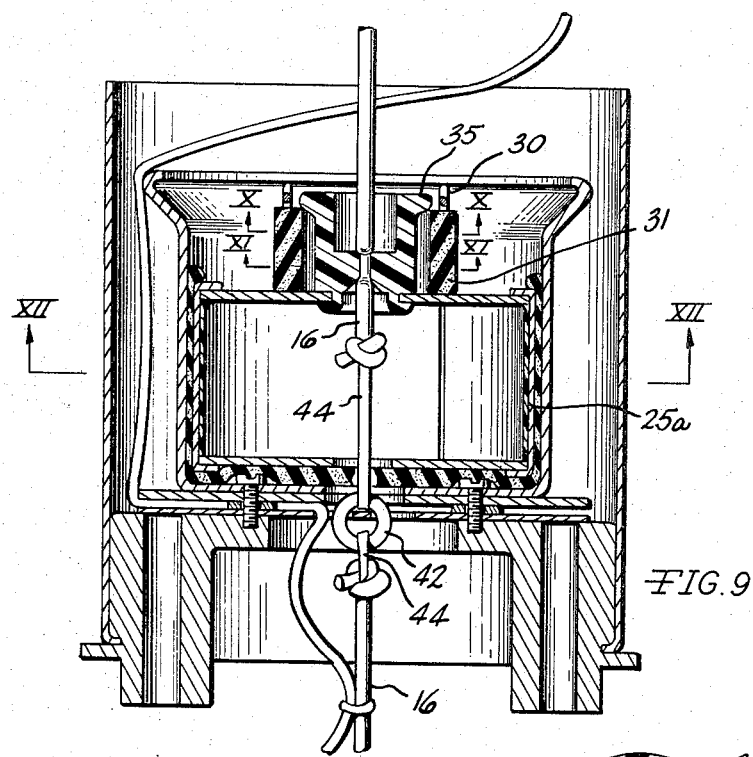
FIG. 9
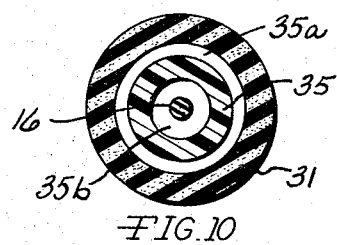
FIG. 10
FIG. 11
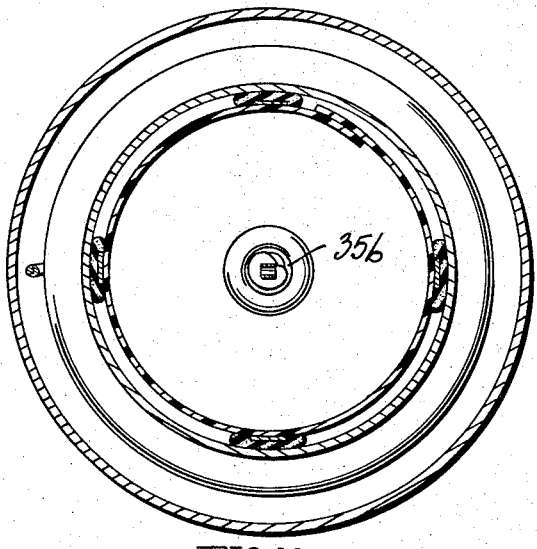
FIG. 12
INVENTOR
JAMES L. LUTES
BY *Beaman & Beaman*
ATTORNEYS April 9, 1968 J. L. LUTES 3,377,615
COMPLIANT SUSPENSION SYSTEM
Filed April 25, 1966 4 Sheets-Sheet 4
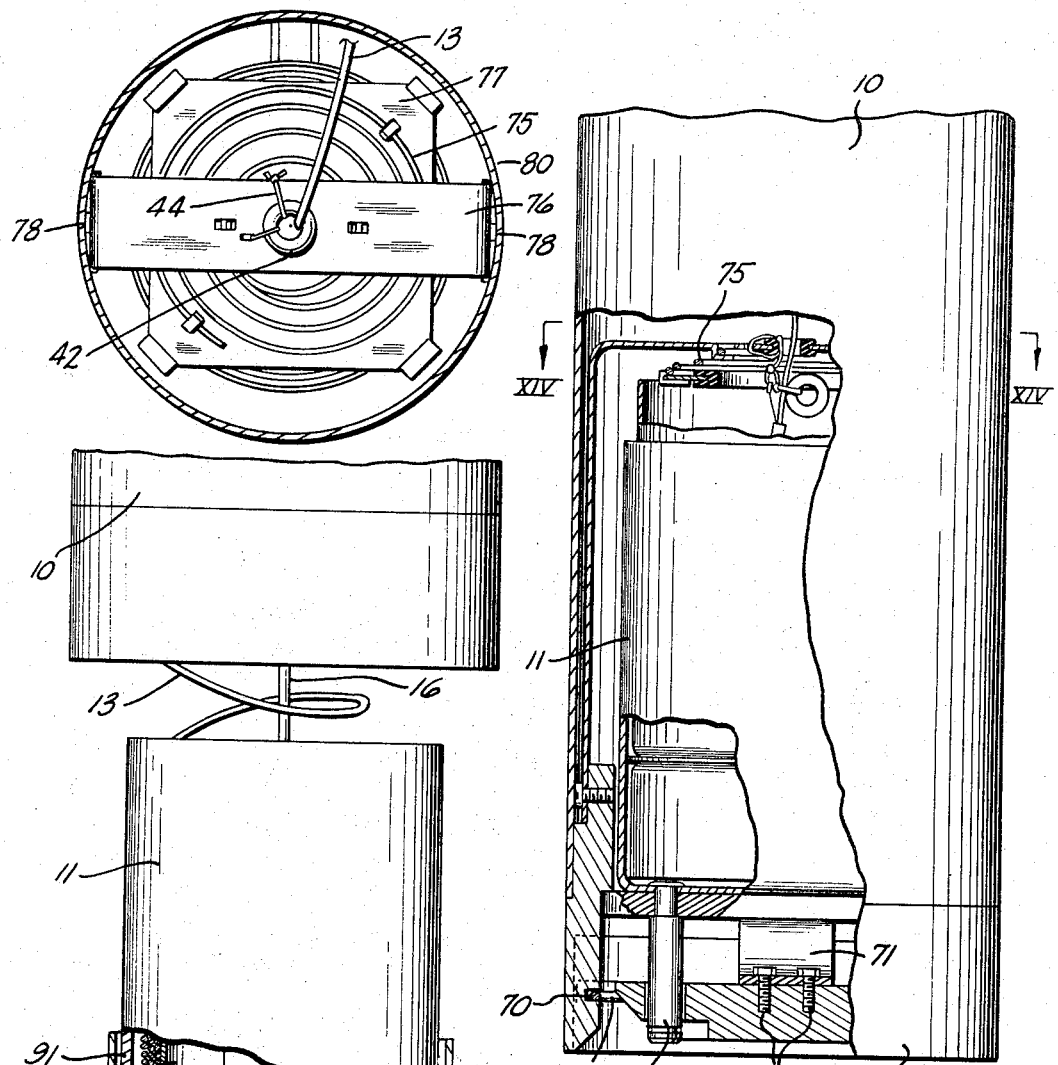
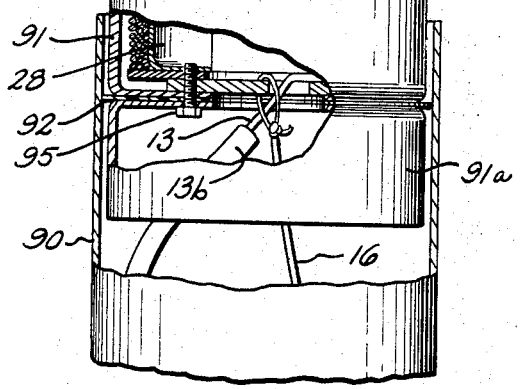
INVENTOR
JAMES L. LUTES
BY Beaman & Beaman
ATTORNEYS

United States Patent Office 3,377,615
Patented Apr. 9, 1968

3,377,615
COMPLIANT SUSPENSION SYSTEM
James L. Lutes, Jackson, Mich., assignor to Sparton Corporation, Jackson, Mich., a corporation of Ohio
Filed Apr. 25, 1966, Ser. No. 545,128
7 Claims. (Cl. 340—2)

ABSTRACT OF THE DISCLOSURE

A system for the compliant suspension and electrical connection between a fluid suspended mass and a free floating buoy comprising a compliant rod elastically supporting a fluid suspended mass from the floating buoy with electrical signal cable encircling the compliant rod and being separated by fluid therefrom, the rod and signal cable suspension system being deployed simultaneously into the fluid from the buoy. The instant system provides for functional placement and stabilization of the sensor system so as to minimize vertical movement within a dynamic fluid environment.

---

The instant invention relates to a compliant suspension system, and particularly to a self-winding mechanism to provide for the compliant suspension of a terminating mass in a fluid which suspension system also provides for functional interconnection between a free floating buoy and a stationary terminating mass operating at a substantial depth within the fluid. More particularly, the instant invention relates to means of construction and method of deployment of a compliant suspension system which provides for electrical connection between a water suspended terminating mass and a surface buoy assembly, for advantageous employment in a sonobuoy underwater sound detection system.

A sonobuoy is often a part of an antisubmarine warfare detection and identification system and such sonobuoys are usually designed to be dropped into the sea from an aircraft or ship to detect underwater sounds and to transmit any such detected sounds to the dispensing vehicle or to other radio receiving stations. It is an expendable item, and when launched from an aircraft is often dropped at altitudes up to 10,000 feet or more. Once deployed, it detects and amplifies underwater sounds to modulate its self-contained transmitter. The signals are then transmitted to reception analyses and display equipment in the aircraft, or transmitted to other receivers for the location determination and identification of underwater sound sources. The effective operation of the sonobuoy system depends upon the maintaining of the acoustic sensor, or the sensor array, motionless relative to water depth while the floating transmitter buoy must, of course, follow the height variations of the ocean's surface. The functional requirement of a supporting line and an electrical interconnection of varying length, between the sensor assembly and the floating buoy, is satisfied by this invention.

Placement and stabilization of the sensor or hydrophone element is extremely critical for precise acoustical signal detection since unwanted signals are generated by the sensing element as a function of varying water depth, i.e., while it moves up and down. Piezoelectric sensing elements, referred to herein as the hydrophone assembly, when subjected to varying pressures will often produce signals of a large magnitude, and accordingly, when subjected to vertical movement within water these hydrophones will produce signals of such magnitude so as to effectively mask the signals being sought. It has now been recognized that these large, low frequency masking signals often overload hydrophone amplifiers and promote distortion; and also produce harmonics that are within range of the audio spectrum of detection interest. It becomes critical, therefore, to provide for an effective suspension system so that the signal-to-noise ratio can be made as large as possible for precise sonobuoy system performance. The novel suspension system of the instant invention also permits the buoy to rise suddenly, even on a high surface wave front, (regardless of the mass of the hydrophone assembly located at considerable water depth) so that signal transmission will not be interrupted by buoy water submersion.

Ideally, the sonobuoy system should have a steady state operational environment. This, of course, is impossible considering the dynamic ocean environment. Waves often provide water surface altitude changes of many feet, and if these changes in altitude are uncompensated in the functional electronic system, the effectiveness of the sonobuoy detection and transmission system would be severely reduced. Therefore, the sensor must remain motionless while the supporting float follows the altitude variations of the ocean's surface with the passing of waves. While the float is in motion, the hydrophone must remain stationary in the water while continuing to derive its support from the surface float, as well as being electrically connected thereto. These operating requirements have been met by providing electrical cable and supporting line which are capable of changing their effective length when strained. The lower compliant suspension system of this invention, which is the interconnection between the terminating mass and the hydrophone per se, meets these same compliant operating requirements. Prior systems for suspending within fluids are not only functionally inadequate, but are inferior in design in that hydrophone deployment is slow and often incomplete due to entanglements in the suspension system. Prior art systems are also stored on fabricated coils and are very expensive to manufacture and require larger storage space than the novel design hereof.

The instant invention provides for a unique solution to the foregoing problems and also provides for a suspension system which is useful in various oceanographic instrumentation situations, as well as in other fluid and space flotation suspension systems. Not only does the invention satisfy the severe requirements of operating in ocean environments, but it also provides for effective instrument operation even after severe shock of air drop ocean impact. The demands of the ocean's dynamic environment are further complicated by in-flight needs prior to drop and the requirements of small package size. Coupled with these design requirements is the necessity of producing a self-winding compliant suspension electrical cable system at an acceptable cost, since the sonobuoy is an expandable item and is not recovered. Only slight relaxation in design requirements, however, have been realized as a result of the need for a low cost sonobuoy system. Furthermore, the above inconsistency between design requirements visavis low cost has been reflected against the realization that large quantities of sonobuoy systems must be manufactured utilizing relatively low skilled manpower. This, of course, means that the suspension system and its storage means, as well as its self-winding deployment system, must be simple to manufacture and easy to assemble.

It is, accordingly, an object of this invention to overcome the foregoing functional and design limitations, and to achieve a highly efficient low cost system for detecting underwater sounds and accurately transmitting generated signals to designated radio receivers.

It is a further object of the instant invention to provide a novel self-winding and storage means for compliant fluid suspension systems.

It is a still further object of the invention to provide apparatus, and its method of manufacture, which provides for functional stability between a free-floating buoy and a fluid suspended mass.

Another object of this invention is to provide for the rapid placement and stabilization of a fluid submerged transducer, particularly useful in underwater sound detection.

A particular object of the invention is to provide for a compliant suspension system which supports a suspended transducer device and maintains the device stationary in the water while in electrical communication with a surface buoy through buoyant signal cable.

Another particular object of this invention is to provide an inexpensive, rugged, easily manufactured suspension system which maintains an acoustical sensor at a relatively fixed position in the water while physically connected to a moving buoy, with the suspension system being provided through the deploying of the interconnection means during water descent.

A still further object of the invention is to provide apparatus to make possible the rapid deployment of a hydrophone to a substantial water depth and to ensure its proper operation and stationary suspension within the water.

The instant invention, its manner of construction, assembly, and use, can be more clearly understood from the following detailed description of an embodiment hereof, taken in conjunction with the accompanying drawings, in which:

FIGURE 1 is a view of an embodiment of the invention showing a resurfaced sonobuoy immediately after starting deployment of the compliant suspension system;

FIGURE 2 shows a completely deployed sonobuoy compliant suspension system with the buoy riding on a wave trough;

FIGURE 3 illustrates the same sonobuoy system as in FIG. 2 with the surface buoy riding a wave crest while the hydrophone element remains substantially stationary;

FIGURE 4 is a top view of the terminating mass assembly after buoy ejection thereof;

FIGURE 5 illustrates the combination of signal cable wound about a length of compliant rod and nylon line;

FIGURE 9 is a cross sectional side view of the terminating mass after weighted release plate ejection and deployment of its compliant suspension system;

FIGURE 10 is a cross sectional top view of the nylon line, retainer, and spool assembly taken along section X—X of FIG. 9;

FIGURE 11 is a sectional top view of the nylon line, spool, and retainer assembly taken along section XI—XI of FIG. 9;

FIGURE 12 is a bottom cross sectional view taken along section XII—XII of FIG. 9 showing the rubber rod storage cavity, signal cable spool, and its container position and spacer arrangement;

FIGURE 13 is a side view of the descent vehicle as contained and mounted within the sonobuoy canister prior to ejection with a partial cutaway illustrating the mating relationship between;

FIGURE 14 is a top view of the descent vehicle spring ejection system taken along section XIV—XIV of FIG. 13; and FIGURE 15 shows the descent vehicle assembly immediately after ejection from the buoy casing.

Figure 7B:
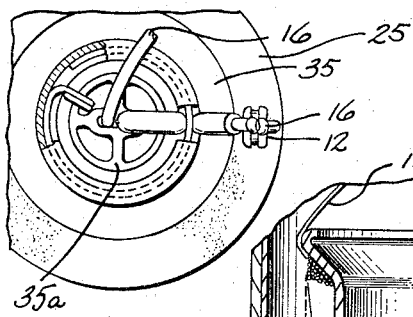
FIGURE 7b is a top view of the rubber rod deployment rate control insert element.

Referring now to the drawings, in which like reference numerals denote like elements in all drawings hereof, in a preferred embodiment of the instant invention, a sonobuoy is depicted in FIG. 1, with floating buoy 10 portion having a terminating mass 11 suspended by nylon line 12 which is encircled by signal cable 13. A weighted release plate 14 is provided to increase the water descent rate, with a transmitting antenna shown generally at 15. Not shown is the sonobuoy rotochute assembly which reduces the rate of air descent and stabilizes the flight characteristics enabling the sonobuoy to be air dropped in precise patterns, and upon water impact provides the force exerted against the bottom retaining plate provides for release mechanism actuation permitting rotochute jettisoning. Simultaneously, and upon water impact, upward movement of the bottom plate causes release of the terminating mass permitting its ejection from the buoy and subsequent deployment to a predetermined operating depth of from 60 to 300 feet, or more. Upon contact with sea water the battery is activated and the sonobuoy system becomes operational within seconds.

FIG. 2 shows a completely deployed sonobuoy compliant suspension system with the surface buoy 10 riding on a wave trough, with rubber supporting rod 16 and nylon line 12 supporting the termination mass 11 in a stationary position with the weighted release plate assembly 14, shown in FIG. 1 having been jettisoned enabling hydrophone 17 and the potted preamplifier 18 assembly to be strung downward by bagged lead weights 19 suspended below termination mass 11 by a short section of rubber rod 16 and a polyurethane foam enclosed nylon ribbon 20, with a twin lead signal cable 13 of continuous length and enclosed in like foam being provided between the sensor 17 assembly, or an array of sensors, and the electronic elements contained within surface buoy 10.

FIG. 3 illustrates the surface buoy 10 in motion while riding a surface wave crest thereby extending rubber rod 16 a sufficient amount to maintain hydrophone 17 substantially stationary within the water. In one embodiment, the Sonobuoy AN/SSQ–48, commonly referred to as Q–48, the suspension system comprises deploying nylon line in an amount of 40 feet followed by 18 feet of rubber rod while simultaneously deploying about 130 feet of twin lead cable encircling said line and rod to provide for a sonobuoy with an operating depths of approximately 90 feet. In another embodiment, the Sonobuoy AN/SSQ–41, commonly referred to as Q–41, 18 feet of rubber rod plays out first, to provide for approximately 60 feet of elongated effective length, which is followed by and tied to 220 feet of nylon line mounted on spool 35 and retained by plastic foam retainer 31 as illustrated in FIG. 4. The small diameter monofilament nylon line is 0.017 in. diameter and can be of another material of substantially similar strength and properties, such as rayon, treated cotton, processed organics, polymerics, and combinations thereof. This line, when deployed, cooperates with its attached extensible rod, which can be rubber, plastic, or other elastic material, to provide the compliant suspension means between the termination mass and main body.

Termination mass 11, provides not only for storage but along with the compliant section extending thereabove, provides for a stable platform to maintain the hydrophone stationary in the water. Hydrophone 17 extends below the terminating mass 11 and is suspended by a short extensible section 16 and signal cable 13.

The hydrophone 17, which detects underwater sounds, is a pressure sensitive unit composed of two diaphragms to which two piezocermic discs are rigidly attached. The diaphragms are separated by an air chamber formed by a spacer mounted between them. The entire assembly is encapsulated in polyurethane covered with a neoprene rubber boot. The discs generate a voltage proportional to the external pressure exerted on the diaphragms.

This generated voltage is then applied to the gate of a field-effect transistor preamplifier 18 which is also potted and sealed. The output of the preamplifier is carried to the audio amplifier through a two-conductor cable 13.

This output is further amplified by an audio frequency amplifier located within canister 10 to a level sufficiently high to modulate the transmitter output, with an AGC circuit being provided optionally to prevent transmitter overmodulation by excessively large sounds such as those emanating from explosions. The audio frequency amplifier output causes variations in bias used to control channel center frequency of a crystal controlled oscillator which is housed along with the antenna base assembly, including an elevated radar and the ground plane elements, as well as the VHF transmitter, in the metal tube 10.

A top view of the terminating mass 11 is shown in FIG. 4, after the terminating mass has been ejected by the surfacing sonobuoy and after the weighted release plate 14 and the hydrophone assembly have been deployed, and after partial development of the main complaint suspension system elements; namely, rubber rod 16, nylon line 12 and signal cable 13. Mounting of the rubber rod and cable spool assembly 25 is provided through polyurethane foam centering strips 26, separating the aluminum metal spacer strips 27 from the signal cable aluminum spool which is centering at its bottom mating surface and spaced from the drawn aluminum can 29. Wireform 30, functions as a spool 25 retainer ring. Polyurethane foam ring 31 provides for retention of nylon line 12 on spool 35 and its orderly playout. Provided in the signal cable spool 28, at its upper circumferential portion, is an indentation and lip for wireform 30 mounting.

FIG. 5 illustrates the coiled configuration of the signal cable 13 as it encircles the rubber rod-nylon line suspending means. Optionally provided at the union between nylon line 12 and rubber rod 16 is a short length of nylon ribbon to ensure the proper jointer and to minimize the possibility of nylon cutting into and severing the rubber rod. The encircled signal cable and the compliant suspension system as shown in FIG. 5 is actually produced during descent of the terminating mass in the fluid. Signal cable 13 is provided in substantially greater length than the rubber rod and nylon line suspending combination means to provide for rubber rod 16 changes in length, and cable 13 is suitably a special purpose twin copper lead polypropylene insulated conductor having a specific density close to 1 and being slightly or neutraly buoyant to assist in maintaining its free state during operation and assist during playout.

Figure 6:
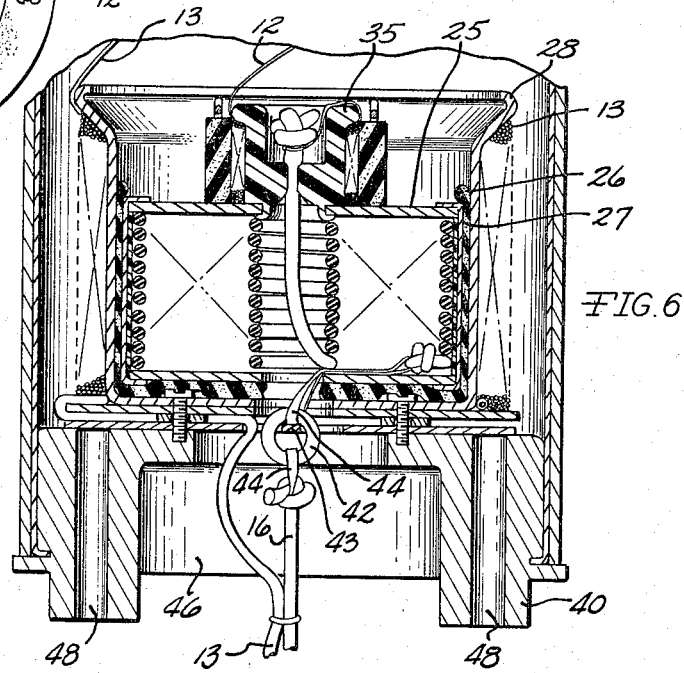
FIGURE 6 shows a cross section of the sonobuoy compliant suspension compact storage system.

The aluminum spool 35 as shown in FIG. 4 and FIG. 6 and FIG. 9 provides for not only the winding of nylon line thereupon but also may be suitably provided with a 0.136-inch diameter center hole through which rubber rod 16 of 0.146-inch diameter is pulled upon full deployment of nylon line 12, as shown in FIG. 5 and FIG. 6. This reduced diameter hole provides a restricted passageway for the rubber rod 16 during its unreeling which functionally provides for controlled descent of the terminating mass 11, and which also provides for orderly deployment of the suspension system while minimizing the possibility of entanglements. The restriction is illustrated in FIG. 10 and FIG. 11, and a preferred design S illustrated in FIGS. 7, 7a, and 7b. The spool 28 is formed with a lip holding wireform 30, and provides support for the signal cable as shown in the cutaway FIG. 6. Also shown in the stored configuration of the compliant suspension system composed of signal cable 13 wound around spool 28 and the rubber rod spool assembly 25 can be seen in FIG. 6, as well as the placement of polyurethane foam strips 26 over aluminum centering strips 27 to maintain a friction fit within the inner sidewall portion of spool 28. FIG. 6 also shows the mechanical fit between the lower lip portion of nylon spool 35 and the upper aluminum plate of the rubber rod container assembly 25. Mounted over anchor bar 43 is rubber grommet 42 connected rubber rod 16 to termination mass 11. The rubber grommet 42 is additionally tied with nylon ribbon 44 to ensure its proper retention and support in the lower aluminum casting 40 hydrophone cavity 46. Not shown in FIG. 6 is the lead weighted release plate 14 which has fallen free from its strip spring engagement within guide pin cavities 48.

Figure 7A:
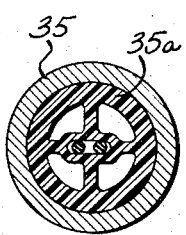
FIGURE 7a is a top cross sectional view of the spool assembly taken along section VIIa—VIIa of FIG. 7.
Figure 7:
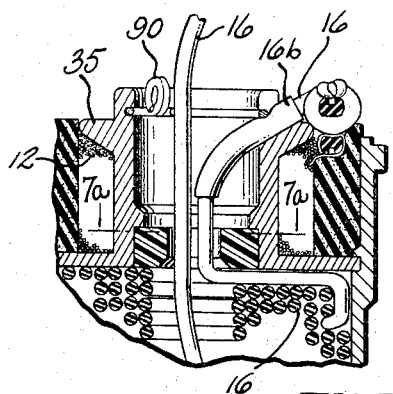
FIGURE 7 is a cross sectional side view of the upper portion of the signal cable storage spool.

FIG. 7 illustrates a novel rubber rod storage and deployment system for Sonobuoy AN/SSQ-41 which provides for rubber rod 16 deployment to be followed by nylon line 12 playout should be greater operating depths be desired. This optional feature is accomplished by removal of wireform retainer 90 concurrent with termination mass ejection. This retaining ring is mounted within the side walls of metal or plastic spool 35, which has an annular groove provided therewithin and in the absence of the spring 90 does not engage the rubber sleeve 16b to hold the rubber rod 16 in place. The rubber rod 16 is in turn connected to nylon line 12. The cross sectional view of FIG. 7 also illustrates the stored configuration of the rubber rod 16 which provides for orderly deployment of rubber rod 16 through the constriction provided within plastic insert 35a shown in FIG. 7a. FIG. 7b shows the top view of spool 35 illustrating the union between nylon line 12 and the rubber rod 16, as well as the restricted opening in plastic insert 35a which provides for the controlled playout of rubber rod 16 therethrough. During the course of rubber rod 16 controlled playout, and simultaneously therewith, signal cable 13 is deployed, thereby fabricating during descent-vehicle downward travel a fully functional compliant suspension system.

A preferred embodiment of the instant invention provides for the manufacture of insert 35a as an integral part with spool 35, as well as the top cover plate of housing 25 being provided as a single part therewith. In so doing, rather than having three separate parts to assemble, a single molded plastic part is provided for ease of further assembly making increased dollar savings possible. This plastic composite part is then mounted within a plastic tubular member to provide a cavity within spool 28 and is manufactured as a tubular half. Further economies are realized since these molded plastic parts need not be treated for corrosion.

Figure 8:
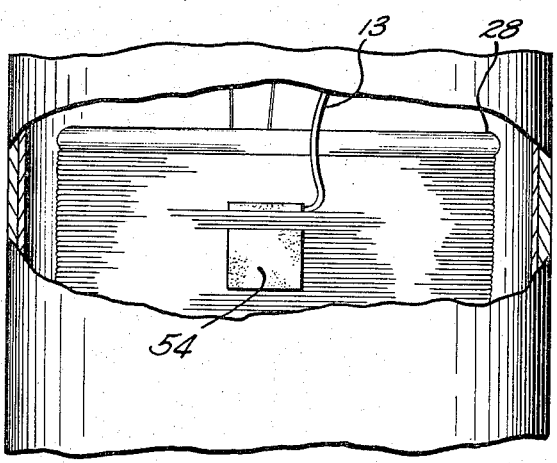
FIGURE 8 shows a partial cut-away side view of the stored signal cable spool assembly with water soluble paper retainer.

In FIG. 8 there is shown a partial cutaway of signal cable 13 wound around spool 28. A water soluble paper retainer 54 is provided for retention of the cable upon the spool. A preferred embodiment for this purpose is the utilization of a sprayed or brushed layed of low tensile strength silastic material which does not adhere to the signal cable insulation but which provides a film of an independent constraining means to keep the signal cable onto spool 28 even during rough handling of the sonobuoy. This low tensile strength silastic constraining means is sufficiently strong to hold the cable onto the spool while yet providing no interference with cable unreeling during sonobuoy deployment.

FIG. 9 shows the storage spools and compartmentized areas for the compliant suspension system, and shows the interconnection means located at the termination mass for the lower compliant rubber rod 16 which supports the acoustical sensing elements therebelow. To prevent tearing of the rubber rod 16, nylon ribbon 44 is used for attachment to grommet 42, which is secured to the upper rubber rod 16 by means of a second section of nylon ribbon 44. On the interior portion of the rubber rod storage chamber 25a is provided a thin Mylar wrapped 60 which acts as a retaining wall for the stored rod 16. The aluminum or plastic spool 35 is cast or suitably cast, molded or machined to provide the illustrated structure and the center rubber extrusion portion.

FIG. 10 represents a cross section of the metal spool 35 and retainer 31 taken along Section X—X of FIG. 9 with the foam polyurethane circular member 31 functioning as a retainer for nylon line stored on spool 35 within the cavity 35a. Cavity 35b is provided for storage of the knot joining the rubber rod and nylon line.

FIG. 11 illustrates the reduced rubber rod cross section 16a within the spool restriction of 0.136 inch which provides for a controlled rate of rubber rod deployment from its storage cavity 25a, with FIG. 11 being a cross sectional view along Section XI—XI of FIG. 9. Rubber rod 16, composed of silicone rubber with a diameter of 0.146-inch has a minimum breaking strength of 15 pounds, and is therefore capable of suspending a rather substantial weight within the water. It provides for a substantial change in the suspending length and is capable of more than doubling in length while suspending a one pound load, with percent elongation, as measured by the following equation, being about 190 percent with a one pound load and about 280 percent with a two pound load:

$$\text{Percent } E = \frac{L_1 - L_2 \times 100}{L_2}$$

with $L_1$ referring to length under load and $L_2$ being the original rod length.

FIG. 12 illustrates the knotted union between nylon line 12 and rubber rod 16 nested within spool cavity 35b and further illustrates the storage space for signal cable 13 to be mounted on spool 28, and also shows the location of the rubber rod storage area disposed directly under aluminum cover plate 25, separated from signal cable spool 28 by aluminum spacer 27 and foam polyurethane strips 26 and further supported by Mylar walls 60. This assembly is housed within termination can 11.

FIG. 13 represents a partial cutaway of the lower termination assembly 11 showing weighted release plate 14 still attached by means of pins 48a and wire spring 70, with said retaining spring being maintained within groove 70a by means of downward pressure exerted by steel C-spring 71 attached to lower weighted release plate 14 by means of screws 72. When dropped into the sea, the kinetic energy of the mass moving into the water causes pressure against plate 14 and flattens curved C-spring 71 to release wireform 70, enabling ejection of descent vehicle 11. During ascent the weighted release plate 14 and termination mass 11 fall free of the buoyant body 10 position as shown in FIG. 1. Rapid deployment of the descent vehicle is assisted by ejection coil spring 75.

In FIG. 14 there is illustrated a top view of the termination mass ejector assembly as mounted within buoy 10, with ejection coil spring 75 being maintained between C-frame 76 and spring floating top plate 77 which forces the descent vehicle downward after retaining ring 70 has sprung clear of its channel 70a. Signal cable 13 extends upward to the electronic circuitry within housing 10 and also extends to the sensing elements and associated circuitry located therebelow. Cable 13 is secured to the upper frame by means of nylon ribbon 44 in conjunction with rubber grommet 42. C-frame 76 is attached to aluminum casting 80 through metal screws 78.

The descent vehicle for the Sonobuoy AN/SSQ–41 is shown in FIG. 15 during its initial water travel while buoy 10 is starting to ascend to its floating position on top of the water, with rubber rod 16 and signal cable 13 being rapidly deployed after initial ejection of the termination mass comprising the combination of canister member 90, having its lower portion attached to the weighted release plate 14 for maximum weight and water descent, with downward assist forces being transmitted to canister assembly 91 through a piston seal effect provided by plastic ring 92 which effectively seals canister 91 to the rapidly descending weighted assembly 90 and which also provides for a friction-fluid coupling between the illustrated mating surfaces as well as the eventual sliding away of weighted assembly 90 therefrom at the end of suspension system deployment. The hydrophone assembly is initially housed within can 91a and is suspended by lower rubber rod 16 and connected to signal cable 13 enclosed within plastic sleeve 13b. The double aluminum cans 91a and 91, secured by screws 95, provide for ease of manufacture and a lowering of cost while yet providing for a rapidly descending vehicle combination having the requisite system storage volume. This double can combination functions as the termination mass and in conjunction with a compliant suspension system as described hereinabove, maintains the hydrophone at a relatively fixed position in the water. As the floating section follows the wave motion, as in FIG. 3, the compliant suspension system stretches and contracts while the position of the termination mass remains fixed. The combination of this double can, which is in slidable sleeve contact with outer weighted release plate can 90 through circular seal ring 92, having action similar to a piston being removed from a cylinder, provides a superior descent vehicle because of its increased weight. At the end of the downward travel and after operating depth has been realized, the exterior can 90, along with its associated weights, falls to the ocean floor, thereby allowing the hydrophone assembly to fall as shown in FIGS. 2 and 3, being pulled downward by the ballast weight 19.

In a still more advanced sonobuoy design, the lower can 91a and the spool assembly 28 are fabricated as a single molded plastic part, with piston ring 92 being formed through a foamed polyurethane tape segment adhesively applied about the circumferential portion thereof.

By providing the simple storage configuration for the suspension system shown in FIG. 6, and FIG. 15, the cable and lines can be securely stored and while deployment thereof, there is but little chance for entanglements or fouling. This unique means of storing the cable, nylon, and rubber rod provides for not only a configuration which is inexpensive to manufacture but also provides for ease and economy of storage, and represents a considerable improvement over previous methods of storage which provide signal cable coils wound within a round rubber section. Another previous method is to wind signal cable and provide it in a suitable coil configuration wound on a lathe mandrel and upon heating the cable is provided with a storage preset. Other problems of manufacture, storage, and deployment are manifest in the prior art systems due to poor design and include inherently high entanglement configurations.

Another novel aspect of sonobuoy deployment involves the utilization of a double can arrangement as shown in FIG. 13, wherein is illustrated the employment of a co-operating dual can descent vehicle for increasing the descent rate of the sensor assembly. The effective mass of the weighted release plate is sufficient to overcome the piston seal between the dual cans after reaching the bottom of its fall in the water and after full line deployment. This enables the sensor assembly to be placed at operating depths very rapidly, while simultaneously fabricating the novel compliant suspension system hereof.

It is therefore obvious to those skilled in the art that various modifications of the inventive concept hereof can be made without departing from the basic content and invention herein. It may be also seen that the objects set forthe hereinabove, and those made apparent from the detailed drawings and description hereof, are efficiently realized; and since certain changes may be made in the above constructions without departing from the concept and inventive scope hereof, it is intended that all matter contained in the foregoing drawings and description shall be interpreted as illustrative and not in a limiting sense.

The invention claimed is:

1. In a sonobuoy having a main body adapted to float in water and having contained therein electronic circuitry, power supply, radio transmitter, antenna assembly, and descent vehicle; within said descent vehicle comprising, in combination;

(a) a hydrophone assembly,
(b) a compliant suspension and electrical cable system,
(c) a termination mass slidably mounted within said main body, spool means mounted within said termination mass and having side walls defining a cavity therewithin, signal cable wound upon said spool and extending between said hydrophone assembly and said electronic circuitry to provide electrical connection therebetween,
extensible rod coiled within said cavity and extending outwardly therefrom through an aperture to make connection to said main body at one end and connection to said termination mass at an opposed end thereof,
said aperture having a width less than the extensible rod diameter as to provide for extrusion as said rod is pulled therethrough,
(d) a weighted cannister unit external said termination mass and in piston-seal cooperating relationship with said termination mass and adapted to fall free therefrom after water suspension,
wall means defining a cavity within said cannister unit,
said hydrophone assembly stored within said cavity and adapted to be deployed therefrom upon cannister unit free fall after water suspension.

2. Apparatus for the deployment of, and for maintaining, a fabricated mass suspended substantially stationary within a fluid while connected to a moving buoyant body comprising, in combination:
(a) a buoyant body containing electronic equipment,
(b) a termination mass adapted to descend rapidly into a fluid and upon reaching a selected fluid depth further adapted to remain substantially at said depth while being electrically coupled to said buoyant body electronic equipment and directly suspended from said buoyant body,
extensible rod means compliantly suspending said mass from said buoyant body,
cable coiled around and encircling said extensible rod means and separated therefrom by the surrounding fluid and electrically connecting said mass to said buoyant body electronic equipment, said coiled cable structure being provided simultaneously with the deployment of said extensible rod means,
(c) a transducer assembly,
extensible means compliantly suspending said transducer assembly to said termination mass, and
cable means electrically connecting said transducer assembly to said termination mass.

3. In apparatus as defined by claim 2 wherein:
small diameter line composed of a material selected from the group consisting of nylon, rayon, treated cotton, polymerics, processed organics, and combinations thereof, is fixed to a section of extensible rod to provide the said means compliantly suspending said mass from said buoyant body.

4. In apparatus for deploying a mass within a fluid wherein the mass is compliantly connected over a substantial distance through the fluid to a buoyant dynamic body which is in electrical connection therewith comprising, in combination:
(a) spool means defining a cavity,
(b) cable wound upon said spool means and electrically connecting said mass to said buoyant dynamic body,
(c) elastic rod means coiled within said cavity along an axis parallel to said cable winding and connected to said mass at one end thereof,
orifice means provided in the walls of said cavity, said rod means extending through said orifice means and connected to said body at an opposed end thereof,
said orifice width being slightly less than the rod diameter and adapted to provide for rod extrusion during deployment thereof thereby controlling the rate of rod travel through said orifice.

5. Apparatus for deployment of a mass within a fluid as defined by claim 4 wherein:
constraining means are provided to surround and hold said wound cable upon said spool prior to deployment thereof,
said constraining means having a tensile strength adequate to provide an independent structural entity surrounding said wound cable and having a strength inadequate to interfere with orderly cable encirclement around said elastic rod means during deployment thereof.

6. A fluid suspension system comprising, in combination:
(a) a buoyant body partially submerged within a fluid,
(b) a suspended stationary mass supported by and disposed below said buoyant body,
(c) a suspended transducer assembly flexibly supported by and disposed below said mass,
extensible rod and connecting line means compliantly suspending said transducer assembly to said mass,
extensible rod and connecting line means compliantly suspending said mass to said buoyant body, so as to effectively maintain a variable distance between said buoyant body moving with changes in fluid height-altitude thereby maintaining said mass substantially stationary within said fluid,
(d) cable means encircling said extensible rod and connecting line means to electrically connect said transducer assembly to said mass and said body,
said encircling cable means being provided simultaneously with the deployment of said extensible rod so as to provide for deployment of said mass and said transducer assembly within said fluid.

7. A method of providing for the compliant suspension and electrical connection between a fluid suspended mass and a surface floating buoy comprising deploying a compliant rod to support and elastically suspend said fluid suspended mass from said floating buoy, said compliant rod being deployed from and connected to said floating buoy, deploying electrical cabling from said floating buoy into said fluid so as to encircle said deployed compliant rod and be separated by fluid therefrom, said cabling being connected to said suspended mass and said floating buoy to provide an electrical circuit therebetween.

References Cited

UNITED STATES PATENTS

| | | | |
|---|---|---|---|
| 2,978,690 | 4/1961 | Kurie et al. | 340—2 |
| 3,281,765 | 10/1966 | Taplin | 340—2 |
| 3,327,968 | 6/1967 | Converse | 244—3 |
| 3,328,750 | 6/1967 | Gimber | 340—2 |

RODNEY D. BENNETT, *Primary Examiner.*

RICHARD A. FARLEY, *Examiner.*

J. G. BAXTER, *Assistant Examiner.*